Feb. 13, 1968   J. H. ADAMS ET AL   3,368,616
GAS TURBINE RECUPERATOR
Filed April 1, 1966
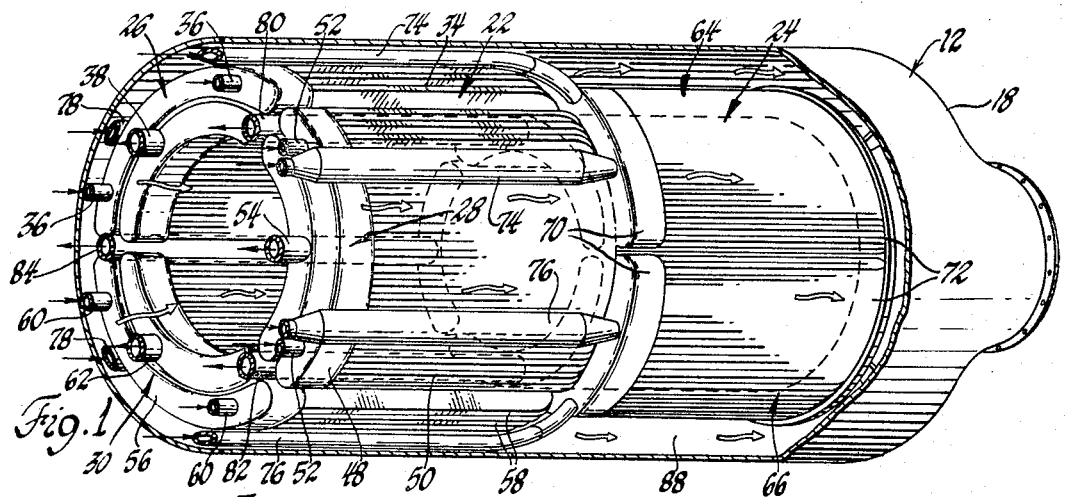
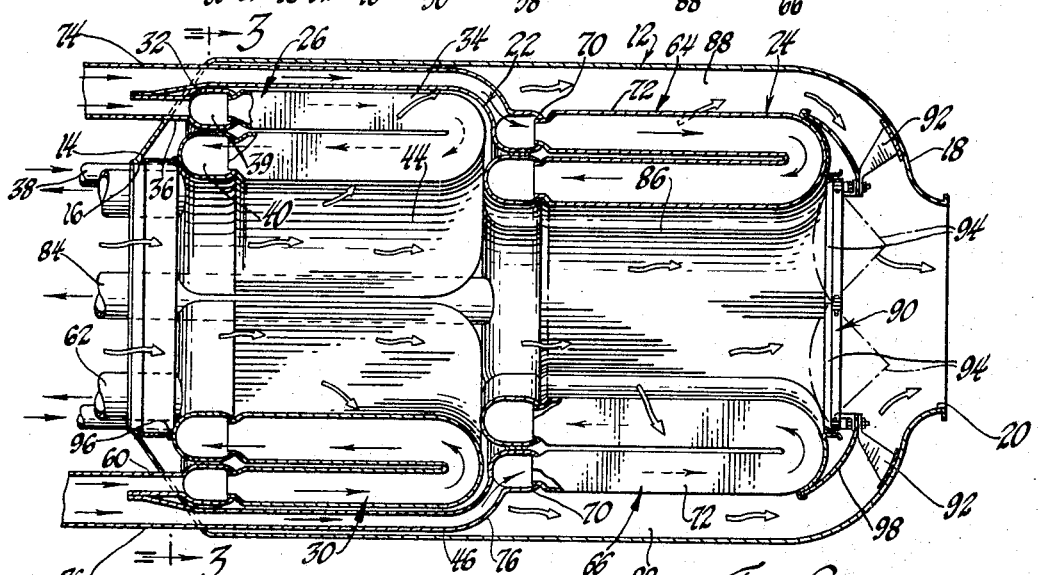
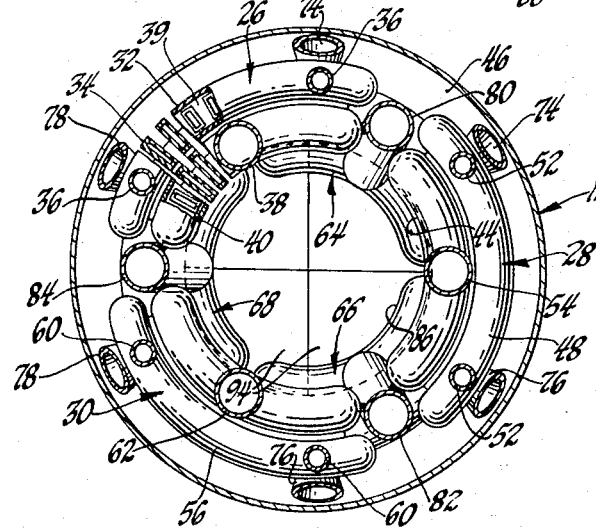
INVENTORS
James H. Adams,
Paul E. Beam, Jr. +
Ester W. Spears, Jr.
F. J. Fodale
ATTORNEY United States Patent Office 3,368,616
Patented Feb. 13, 1968

3,368,616
GAS TURBINE RECUPERATOR
James H. Adams, Mooresville, and Paul E. Beam, Jr., and Esten W. Spears, Jr., Indianapolis, Ind., assignors to General Motors Corporation, Detroit, Mich., a corporation of Delaware
Filed Apr. 1, 1966, Ser. No. 539,344
10 Claims. (Cl. 165—164)

Our invention relates generally to a recuperator and more specifically to a recuperator especially suitable for but not limited to use with an aircraft gas turbine engine.

One of the major problems associated with a tubular gas turbine recuperator is that of large differential thermal expansion of the tubes due to the large temperature gradients and relatively long tubes required. The tubular type of recuperator which comprises a multitude of parallel air tubes oriented parallel to the engine centerline in an annular matrix with an inlet manifold at the aft end and an outlet manifold at the forward end of the recuperator (or vice versa) cannot withstand such severe differential thermal expansions resulting in buckling of the air tubes and ultimate failure of the recuperator. Our general approach to this problem in our invention is to use U-shaped air tubes which are sufficiently flexible to be capable of accommodating the differential expansion without failing. Our approach, however, introduces another difficulty in that the air inlet and outlet manifolds are now located adjacent to each other. This presents a problem in providing engine ducting suitably arranged to structurally support the recuperator and minimize frontal area. The manifolding must be compact and light and yet minimize the air flow pressure loss through it. Another consideration in minimizing the flow pressure loss on the air side of the recuperator is that the U-tubes must be maintained reasonably short. In order to do this, we have found that it may be necessary to provide two sets of modules of axially disposed U-tubes. This, of course, increases the manifolding problem. The exhaust gas flow pressure losses must also be minimized for an optimum design. In addition, it is desirable to have the exhaust gases bypass, wholly or partially, the recuperator with minimum flow pressure losses when full power of the gas turbine engine is required, such as, during take-off.

Accordingly, the object of our invention is to provide a recuperator utilizing U-shaped air tubes to accommodate differential thermal expansion while at the same time providing suitable manifolding and maintaining the U-tube lengths reasonably short to minimize air flow pressure losses and to assemble the parts in a unique way so that the gas flow losses are also minimized for both a recuperative and a bypass configuration.

The exact nature of this invention as well as other objects and advantages thereof will be readily apparent from consideration of the following specification relating to the annexed drawing in which:

FIGURE 1 is a perspective view of a preferred embodiment of an aircraft gas turbine recuperator in accordance with our invention.

FIGURE 2 is a view taken on a plane containing the longitudinal axis of the recuperator shown in FIGURE 1.

FIGURE 3 is a section taken along the line 3—3 of FIGURE 2 and looking in the direction of the arrows.

Referring now to FIGURE 2, we have shown an aircraft gas turbine recuperator in accordance with our invention comprising a cylindrical housing 12. On the front portion of the housing 12 is an integral frusto-conical end wall 14 which reduces the housing diameter and forms an inlet 16 which is adapted to be mounted on and continuous with a gas turbine exhaust outlet (not shown). Likewise, the rear portion 18 of the casing 12 is reduced in diameter by a continuous curved wall to form an exhaust outlet 20. The recuperator includes two sets of recuperator modules indicated generally at 22 and 24. The two sets were thought to be necessary in order to maintain the axial length of the U-tubes reasonably short to minimize air flow losses.

The module sets are of approximately equal axial length with each set comprising three arcuate modules. The front set 22 consists of the three arcuate modules 26, 28, and 30, each of which are a little less than 120°. (See FIGURE 3.) The front modules are substantially identical so that the description of one module will suffice. The module 26 is made up of an arcuate header 32 and a number of U-tubes 34 which extend axially rearwardly from the header 32. The header 32 is divided into an outer inlet chamber 39 and an inner outlet chamber 40. The open ends of the U-tubes are connected to header 32 such that one open end on each U-tube is in fluid communication with the inlet chamber 39 and the outlet chamber 40, respectively. This can be accomplished in any suitable manner such as mounting the open ends in the header. The construction of the header and the U-tubes are best understood from FIGURES 1 and 2. While we have shown rather large U-tubes, it is to be understood that each U-tube may comprise a bundle of U-tubes of relatively small diameter. In addition, the module 26 is provided with a pair of inlet ducts 36 and a single outlet duct 38. The inlet ducts 36 are located adjacent the respective circumferential ends of the inlet chamber 39 portion of the header 32 and extend forwardly through the forward wall 14 of the housing 12. The single outlet duct 38 is provided in communication with the outlet chamber 40 and extends forwardly from the center of the header 32 through the front wall 14. Because the outlet chamber 40 is located radially inwardly of the inlet chamber 39, the outlet duct 38 also will be located radially inwardly of the inlet ducts 36. In addition to being located radially inwardly of the inlet ducts 36, the outlet duct 38 bisects the circumferential spacing between the inlet ducts 36. As shown, the module 26 is located radially within the housing 12 so that it is susbtantially radially aligned with the forward wall 14 with the innermost wall of the header 32 and the U-tubes 34 extending below the inlet 16 only a small amount.

In like manner, the module 28 comprises a header 48, a plurality of U-tubes 50, a pair of inlets 52, and a single central outlet 54. The module 30 comprises a header 56, a plurality of U-tubes 58, a pair of inlets 60 and a single central outlet 62.

As previously mentioned, the first set comprises three modules 26, 28, and 30. These modules are disposed in the housing 12 adjacent the inlet 16 and extend for approximately half its axial length. The modules are circumferentially placed with each module having its circumferential end walls adjacent the circumferential end walls of the other modules so that the first set is somewhat annular in cross section. In other words, the first set is an annulus except for the spaces between the modules. (See FIGURE 3.) The first somewhat annular set is radially located within the cylindrical housing 12 such that it divides the space within the housing into two portions; an inner circular passage 44 and an outer annular passage 46 between the first annular set and the outer wall of the housing 12. The circular passage 44 is continuous with the inlet 16 to receive the exhaust gases of a turbine outlet while the annular space 46 forms an exhaust passage adapted to receive exhaust gases after they have flowed radially outwardly over the U-tubes 34, 50, and 58.

As mentioned above, the aft set 24 is substantially identical to the forward set 22. It also comprises three arcuate modules 64, 66, and 68. Each of the modules 64, 66, and 68 comprises a header 70 and a number of U-tubes 72. Likewise each of the modules 64, 66, and 68 have a pair of inlet ducts 74, 76, and 78 adjacent its circumferential edges, respectively. The inlet ducts 74, 76, and 78 extend forwardly into the annular passage 46 and protrude out of the forward wall 14. The headers 70 of the rear set modules 64, 66, and 68 have outlet ducts 80, 82, and 84 which extend forwardly from the centers of the modules 64, 66, and 68, respectively. The rear set of modules is also placed so as to present a somewhat annular cross section. It likewise divides the aft portion of the housing space into an inner circular passage 86 which is continuous with a central passage 44 of the forward set. The outer annular passage 88 formed by the aft set is continuous with the forward annular passage 46. The parting lines between the modules of the aft set 24, however, contain less spaces and are offset from the forward set 22 so that the exhaust ducts 80, 82, and 84 of the rear set 24 extend forwardly into the larger circumferential spaces between the modules 26, 28, 30 of the forward set. The aft set of modules 24 thus are closer to being a 120° than the forward set 22. (See FIGURE 3.) Summarizing the location of the inlets and the outlets for the individual modules of the forward and aft sets 22 and 24, it can be seen from FIGURE 3 that there are twelve inlets and six outlets. The twelve inlets comprise six circumferentially spaced pairs of inlets. Each pair of inlets in turn comprises an inlet duct to the forward set and an inlet duct to the aft set. As shown in FIGURE 2, each pair of inlets may be manifolded into a single inlet on the outside of the housing 12 in which case, there would be six circumferentially spaced inlets. The six outlet ducts are equally circumferentially spaced and alternated so that every other outlet duct communicates either with the forward set 22 or the aft set 24, respectively. Thus we have provided compact and suitable manifolding. The division of the compressor flow between the forward and aft module sets minimizes air flow losses and the return of the preheated compressed air from six alternated circumferentially spaced outlets provides a nearly uniform temperature level at the combustor inlet.

Returning to FIGURE 2, the second set 24 is seen to be axially spaced from the recuperator outlet 20. A closure means indicated generally at 90 is mounted adjacent the aft end of the second set 24 by a number of struts 92 suspended from the rear wall 18 of the housing 12. The closure means comprises four circular segmented gates 94 pivoted for movement between a closed and open position. The open position is shown in phantom in FIGURE 2. An annular seal 96 extends from the inner circumference of the forward wall 14 to the front edge of the modules of the first set 22 while an annular seal 98 extends from the rear edge of the second set 24 to the closure means 90. This completes the separation between the inner circular passage 44–86, and the outer annular passage 46–88 except for radial flow between the U-tubes of the recuperator modules.

The operation of the device is as follows: The inlets 36, 52, 60, 74, 76, and 78 are connected to the compressor discharge of a typical gas turbine engine. The outlets 42, 54, 62, 80, 82, and 84 are connected to the combustor inlet of that same engine so that the compressor discharge air flows through the recuperator modules prior to its entry into the combustor. The flow of the compressor discharge air through the modules is shown in the figures by the thin black arrows. With the gates 94 in their closed or solid line position, the gas turbine exhaust gases flow axially into the recuperator housing 12 through the inlet 16. Because the aft end of the central passage 86 is closed by the gates 94, the exhaust gases flow radially outwardly in a heat transfer relationship with the U-tubes 34, 50, 58, and 72. After having transferred heat to the compressor discharge air within the U-tubes, the exhaust gases flow into the outer annular passage 46–88. The gases then flow downstream around the closed gate valves 94 and exit through the recuperator outlet 20. The exhaust gas flow is shown by the larger open face arrows.

Thus it can be seen that we have provided a gas turbine recuperator which provides two sets of recuperator modules. Each set being in a cross-counterflow heat transfer relationship with the exhaust gases of a gas turbine engine. This design maintains the U-tube length reasonably short to minimize air flow losses. This is accomplished through the use of unique and compact manifolding which is also designed to minimize flow losses through it. When the gate valves 94 are in their open or dotted line position, the exhaust gases will take the path of least resistance and flow through the continuous circular central passages 44 and 86 and exit through the recuperator outlet 20 past the open gate valves 94 thus bypassing the recuperator. Thus the design also accommodates a minimum flow loss for the exhaust gases when the recuperative gas turbine engine is in a bypass configuration for maximum power. Of course, the gate valves 94 can maintain intermediate positions varying the amounts of recuperative and bypass exhaust flow.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention.

We claim:

1. A recuperator for a gas turbine engine or the like, comprising, in combination, a cylindrical housing having radially inwardly extending portions at its forward and aft ends forming an inlet and an outlet, respectively, a first set of recuperator modules disposed in said housing adjacent said inlet, each of said modules comprising an arcuate header having an inlet chamber and an outlet chamber, a plurality of circumferentially spaced axially rearwardly extending U-tubes having its free ends in communication with said inlet and outlet chambers, respectively, inlet means for said inlet chamber, and outlet means for said outlet chamber, said inlet and outlet means extending through said forward portion of said housing whereby said first set is adapted to have a fluid flow therethrough, said modules being circumferentially spaced so that said first set is somewhat annular in cross section, and radially spaced from said housing to form a first central passage within said first set and a first annular passage between said first set and said housing, a second set of recuperator modules disposed in said housing axially adjacent said first set, each of said modules comprising an arcuate header having an inlet chamber and an outlet chamber, a plurality of circumferentially spaced, axially rearwardly extending U-tubes having its ends in communication with said inlet and outlet chambers, respectively, inlet means for said inlet chamber and outlet means for said outlet chamber, said inlet means and outlet means extending through said forward portion of said housing whereby said second set is adapted to have a fluid flow therethrough, said modules being circumferentially spaced so that said second set is somewhat annular in cross section and radially spaced from said housing to form a second central passage continuous with said first central passage and a second annular passage continuous with said first annular passage, and closure means mounted axially adjacent the aft end of said second set of recuperator modules to block said central passage, said closure means being axially spaced from said exit whereby said recuperator is adapted to have exhaust gases flow axially thereinto and radially outwardly into a heat transfer relationship with said first and second sets of modules and into the annular passage between said sets of modules and said housing, said exhaust gases exiting through said outlet.

2. The recuperator as defined in claim 1 wherein the modules of said second set are offset with respect to the modules of said first set.

3. The recuperator as defined in claim 1 wherein the modules of said second set are substantially equal in axial length to said first set and wherein said first and second set are substantially equal in axial length to said housing.

4. The recuperator as defined in claim 3 wherein the modules of said second set are offset with respect to the modules of said first set.

5. The recuperator as defined in claim 4 wherein the inlet means of said second set is disposed in said first annular passage and the outlet means of said second set is disposed circumferentially between the modules of said first set.

6. The recuperator as defined in claim 4 wherein the circumferential ends of said modules in said first set bisect the modules in said second set.

7. The recuperator as defined in claim 6 wherein said outlet means of said second set are in the center of said second set modules and extend circumferentially between the modules of said first set, said first set outlet means being in the center of the said first set modules whereby said first and second outlet means are equally alternately circumferentially spaced.

8. The recuperator as defined in claim 7 wherein said first and second inlet means extend from their respective modules adjacent their circumferential edges whereby said first and second inlet means form pairs which are circumferentially aligned and are circumferentially spaced from other pairs.

9. The recuperator as defined in claim 8 wherein said closue means are movable between an open and a closed position whereby said exhaust gases may bypass said modules when said closure means are in said open position.

10. The recuperator as defined in claim 1 wherein said closure means are movable between an open and a closed position whereby said exhaust gases may bypass said modules when said closure means are in said open position.

References Cited
UNITED STATES PATENTS

| | | | |
|---|---|---|---|
| 3,201,938 | 8/1965 | Zirin | 60—39.51 |
| 3,222,864 | 12/1965 | Dyste et al. | 60—39.51 |
| 3,267,673 | 8/1966 | Hemsworth et al. | 60—39.51 |

ROBERT A. O'LEARY, *Primary Examiner.*

M. A. ANTONAKAS, *Assistant Examiner.*